United States Patent
Greasamar et al.

(10) Patent No.: US 10,041,582 B2
(45) Date of Patent: Aug. 7, 2018

(54) VEHICLE ACCESSORY CONTROLS, AND METHODS OF USE AND MANUFACTURE THEREOF

(71) Applicant: Honda Motor Co., Ltd., Tokyo (JP)

(72) Inventors: Christopher J. Greasamar, Ostrander, OH (US); Christopher L. Steinmeyer, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 437 days.

(21) Appl. No.: 14/804,646

(22) Filed: Jul. 21, 2015

(65) Prior Publication Data

US 2017/0023127 A1    Jan. 26, 2017

(51) Int. Cl.

| | |
|---|---|
| *F16H 59/02* | (2006.01) |
| *G05G 1/02* | (2006.01) |
| *E01H 5/06* | (2006.01) |
| *B60K 23/00* | (2006.01) |
| *B60K 17/348* | (2006.01) |
| *B60K 20/02* | (2006.01) |
| *B60K 23/08* | (2006.01) |

(52) U.S. Cl.
CPC ....... *F16H 59/0217* (2013.01); *B60K 17/348* (2013.01); *B60K 20/02* (2013.01); *B60K 23/00* (2013.01); *B60K 23/08* (2013.01); *E01H 5/061* (2013.01); *G05G 1/02* (2013.01); *B60K 2023/0891* (2013.01); *B60Y 2200/124* (2013.01)

(58) Field of Classification Search
CPC .... F16H 59/0217; F16H 59/08; F16H 59/006; F16H 59/0243; B60K 23/08; B60K 20/02; B60K 17/348; B60K 23/00; B60K 2023/0891; E01H 5/061; G05G 1/02; B60Y 2200/124; B62M 25/08; B60W 50/082; B62K 11/14; E02F 3/848; E02F 3/7609; E02F 9/2041; B66D 1/505

USPC ......................................................... 307/9.1
See application file for complete search history.

(56) References Cited

U.S. PATENT DOCUMENTS

| | | | |
|---|---|---|---|
| 4,554,751 A | * | 11/1985 | Nicolosi ......... B60W 30/18181 37/234 |
| 6,033,338 A | | 3/2000 | Jackson et al. |
| 6,722,220 B2 | | 4/2004 | Takeda |
| 7,458,917 B2 | | 12/2008 | Yoshikawa et al. |

(Continued)

*Primary Examiner* — Adi Amrany
(74) *Attorney, Agent, or Firm* — Kenealy Vaidya LLP

(57) ABSTRACT

Some embodiments are directed to a control system for use with a vehicle having handlebars that are configured to enable vehicle steering. The handlebars define a pair of grasping portions that are disposed to facilitate grasping by a vehicle operator's hands. The vehicle also includes a powertrain and an accessory. The control system includes a manually actuable primary selector disposed adjacent one of the grasping portions to enable manual actuation while one of the vehicle operator's hands grasps the one grasping portion. The primary selector is configured to operate in a powertrain mode to control an aspect of the powertrain, and to operate in a separate accessory mode to control an aspect of the accessory. A manually actuable override selector is disposed adjacent the one grasping portion. The override selector is configured to be manually actuable to switch the primary selector between the powertrain mode and the accessory mode.

20 Claims, 6 Drawing Sheets

(56) References Cited

U.S. PATENT DOCUMENTS

| | | |
|---|---|---|
| 8,678,976 B1 | 3/2014 | Wilson et al. |
| 9,086,130 B1 * | 7/2015 | Anderson ............ F16H 59/0217 |
| 2007/0051552 A1 * | 3/2007 | Reed ...................... B62K 11/14 |
| | | 180/333 |
| 2016/0146334 A1 * | 5/2016 | Nelson ................ F16H 61/0204 |
| | | 701/22 |

* cited by examiner

VEHICLE ACCESSORY CONTROLS, AND METHODS OF USE AND MANUFACTURE THEREOF

BACKGROUND

The disclosed subject matter relates to vehicle accessory controls, and methods of use and manufacture thereof. More particularly, the disclosed subject matter relates to methods and apparatus for controlling certain vehicle features, including but not limited to features that relate to vehicle accessories, features that are more directly related to vehicle powertrain performance, etc.

Vehicles may be configured to satisfy or achieve a variety of performance capabilities, and may tailor controls and associated structures to suit anticipated usages. For example, some vehicles that are relatively small in size, such as motorcycles, all-terrain vehicles (ATVs), etc., may provide a relatively open seating area for the vehicle operator and/or other occupants, and may tailor certain controls to suit this structure and environment. In some cases, these vehicles include handlebars for steering, which enable the operator to maneuver the vehicle along a desired course of travel. The handlebars can be configured to enable the operator to grasp a pair of grasping portions, which are provided at opposing sides of the handlebars, with both hands to maintain control over the vehicle when moving.

SUMMARY

It may be beneficial for the vehicle operator to continuously or semi-continuously grasp the grasping portions of the handlebars during vehicle operation, movement, etc., to maintain control over the vehicle. However, the continuous or semi-continuous grasping of these portions of the handlebars with both hands may impede other tasks or otherwise make performance of these tasks more difficult. Thus, it may be beneficial to enable vehicle operators to perform other tasks while grasping the grasping portions of the vehicle handlebars to facilitate vehicle control and operation.

For example, other controls may be provided at or adjacent the grasping portions of the handlebars to enable a user to access and/or operate these controls while still maintaining contact with the handlebars. In one such example, gear shifting controls may be provided at or adjacent the grasping portions of the handlebars to enable the vehicle operator to shift gears while grasping or otherwise maintaining contact with the handlebars. For example, portions of one of the vehicle operator's hands, such as the palm, one or more fingers, etc., may maintain contact with one of the grasping portions of the handlebars, while other portions of that same hand, such as other finger(s), operate the gear shifting controls.

The gear shifting controls may be disposed and configured to facilitate use while the vehicle operator grasps the grasping portions of the handlebars, i.e., the controls may be accessed with one hand while the user grasps the handlebars with the same hand. In some cases, the gear shifting controls are provided at or adjacent the grasping portions of the handlebars and in the form of a pair of buttons that are configured for actuation by being depressed. Depressing one button may instruct the transmission to shift to a lower gear, while depressing the other button may instruct the transmission to shift to a higher gear.

A limited amount of space is available at or adjacent the grasping portions of the handlebars, i.e., at a location that may be accessed by a vehicle operator while grasping the handlebars. Thus, only a certain number of other controls can be provided at this location. It may therefore be beneficial to selectively dispose controls that are critical to the vehicle operation (such as the powertrain performance), frequently used during operation, etc., at or adjacent the grasping portions of the handlebars, which can be characterized as a prime location, and to dispose other controls at other locations.

In other words, it may not be possible for all controls to be disposed at this prime location due to space constraints. For example, providing a vehicle with a relatively large number of controls, or controls having a certain configuration, may preclude some controls from being disposed at or adjacent the grasping portions of the handlebars. Thus, it may be necessary to dispose these controls (including but not limited to controls used to operate vehicle accessories) at locations that can only be accessed by removing one of the user's hands from the grasping portions of the handlebars.

As one example, some of the vehicles disclosed above include a winch, which can be used for a variety of purposes. The winch can cooperate with a cable that is connectable to an object, which may thereby enable the vehicle to pull the object. The winch may be controlled to increase or decrease a length of the cable available for use. Alternatively, the winch can communicate with a plow blade that is attached to the vehicle to enable the plow blade to be raised or lowered. However due to space constraints, the winch controls may not be located at or adjacent the grasping portions of the handlebars.

As discussed above, it may be inconvenient, unsafe, etc. for a vehicle operator to cease grasping the handlebars during operation, even though the operator may need to do so to operate certain vehicle controls. It may therefore be beneficial to address this issue, such as by increasing the number of controls that can be accessed while the user grasps the grasping portions of the handlebars, even though a limited amount of space is available for such controls.

Some embodiments address this space constraint and increase the number of controls that are safely and/or conveniently accessible by using the same controls or control structures for multiple operations. The nature of certain controls may facilitate this dual or multiple usage. For example, the separate buttons, which are actuable to instruct the transmission to either shift gears upward or downward, can also be used to instruct the winch to move in opposing directions, such as to increase or decrease a length of the cable, or to raise or lower the plow blade. Some embodiments include an override selector to enable these multi-use controls to be switched between the multiple different usages. For example, manipulating the override selector may enable the controls to be used for one type of operation, while either not manipulating the override selector (or manipulating the override selector in a different way) may enable the same controls to be used for another different type of operation.

Some embodiments are therefore directed to a control system for use with a vehicle having handlebars that are configured to enable vehicle steering. The handlebars can define a pair of grasping portions that are disposed to facilitate grasping by a vehicle operator's hands. The vehicle can also include a powertrain and an accessory. The control system can include a manually actuable primary selector disposed adjacent one of the grasping portions to enable manual actuation while one of the vehicle operator's hands grasps the one grasping portion. The primary selector can be configured to operate in a powertrain mode to control an aspect of the powertrain, and to operate in a separate accessory mode to control an aspect of the accessory. A manually actuable override selector can be disposed adjacent the one grasping portion. The override selector can be configured to be manually actuable to switch the primary selector between the powertrain mode and the accessory mode.

Some other embodiments are directed to a vehicle for transporting an operator. The vehicle can include handlebars that are configured to enable vehicle steering. The handlebars can define a pair of grasping portions that are disposed to facilitate grasping by hands of the operator. The vehicle can also include a powertrain and an accessory that is at least in part separate from the powertrain. The vehicle can further include a control system having a manually actuable primary selector disposed adjacent one of the grasping portions to enable manual actuation while one of the vehicle operator's hands grasps the one grasping portion. The primary selector can be configured to operate in a powertrain mode to control an aspect of the powertrain, and to operate in a separate accessory mode to control an aspect of the accessory. The control system can also include a manually actuable override selector that can be disposed adjacent the one grasping portion. The override selector can be configured to be manually actuable to switch the primary selector between the powertrain mode and the accessory mode.

Still other embodiments are directed to a method of manufacturing a control system for use with a vehicle. The vehicle can include handlebars that are configured to enable vehicle steering. The handlebars can define a pair of grasping portions that are disposed to facilitate grasping by a vehicle operator's hands. The vehicle can also include a powertrain and an accessory. The method can include: disposing a manually actuable primary selector adjacent one of the grasping portions to enable manual actuation while one of the vehicle operator's hands grasps the one grasping portion; configuring the primary selector to operate in a powertrain mode to control an aspect of the powertrain, and to operate in a separate accessory mode to control as aspect of the accessory; disposing a manually actuable override selector adjacent the one grasping portion; and configuring the override selector to be manually actuable to switch the primary selector between the powertrain mode and the accessory mode.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIG. 1-7, wherein like numbers indicate the same or corresponding elements throughout the views.

1. Overall Vehicle

Figure 1:
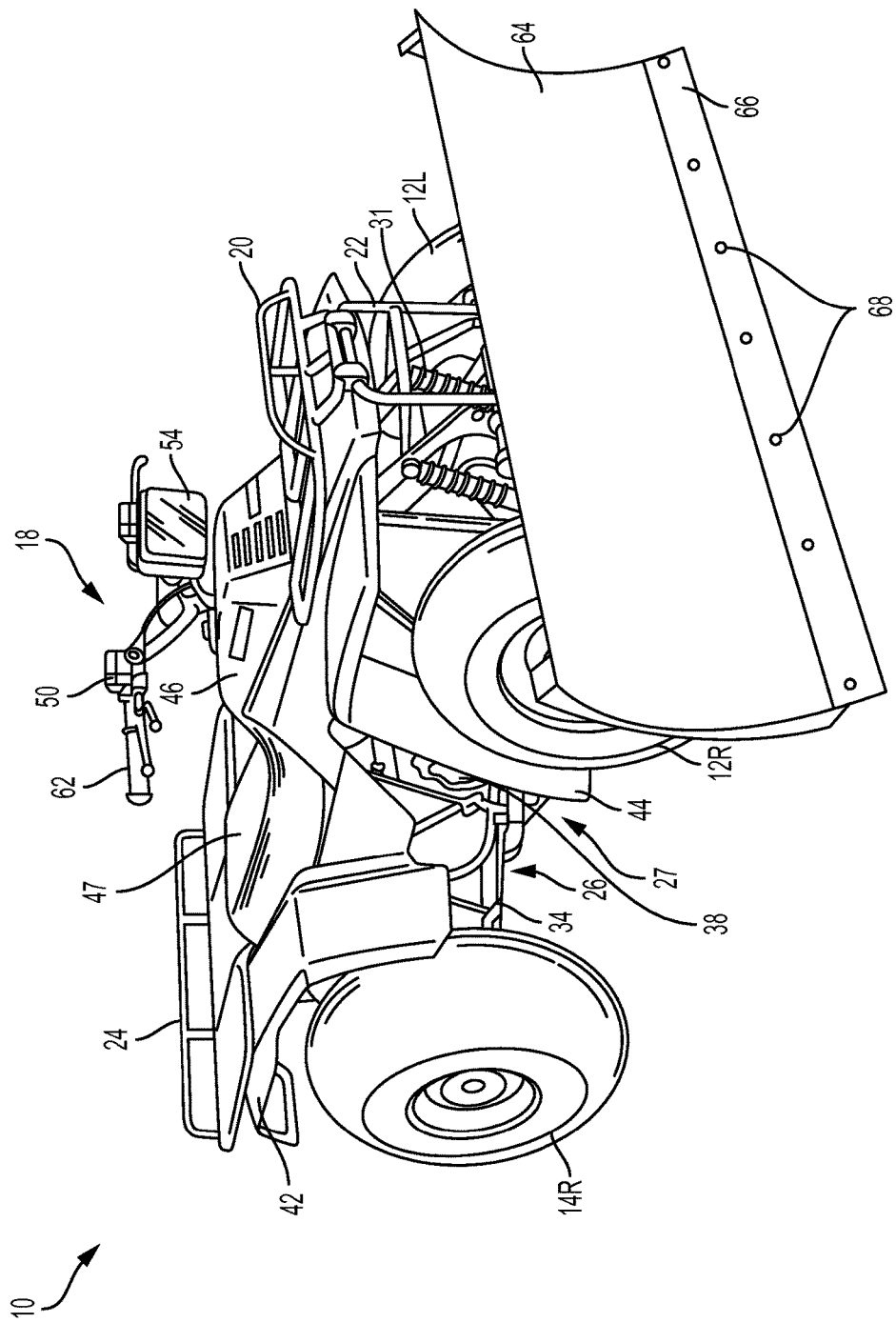
FIG. 1 is an elevated front perspective view depicting a vehicle with an attached vehicle accessory in accordance with the disclosed subject matter.
Figure 3:
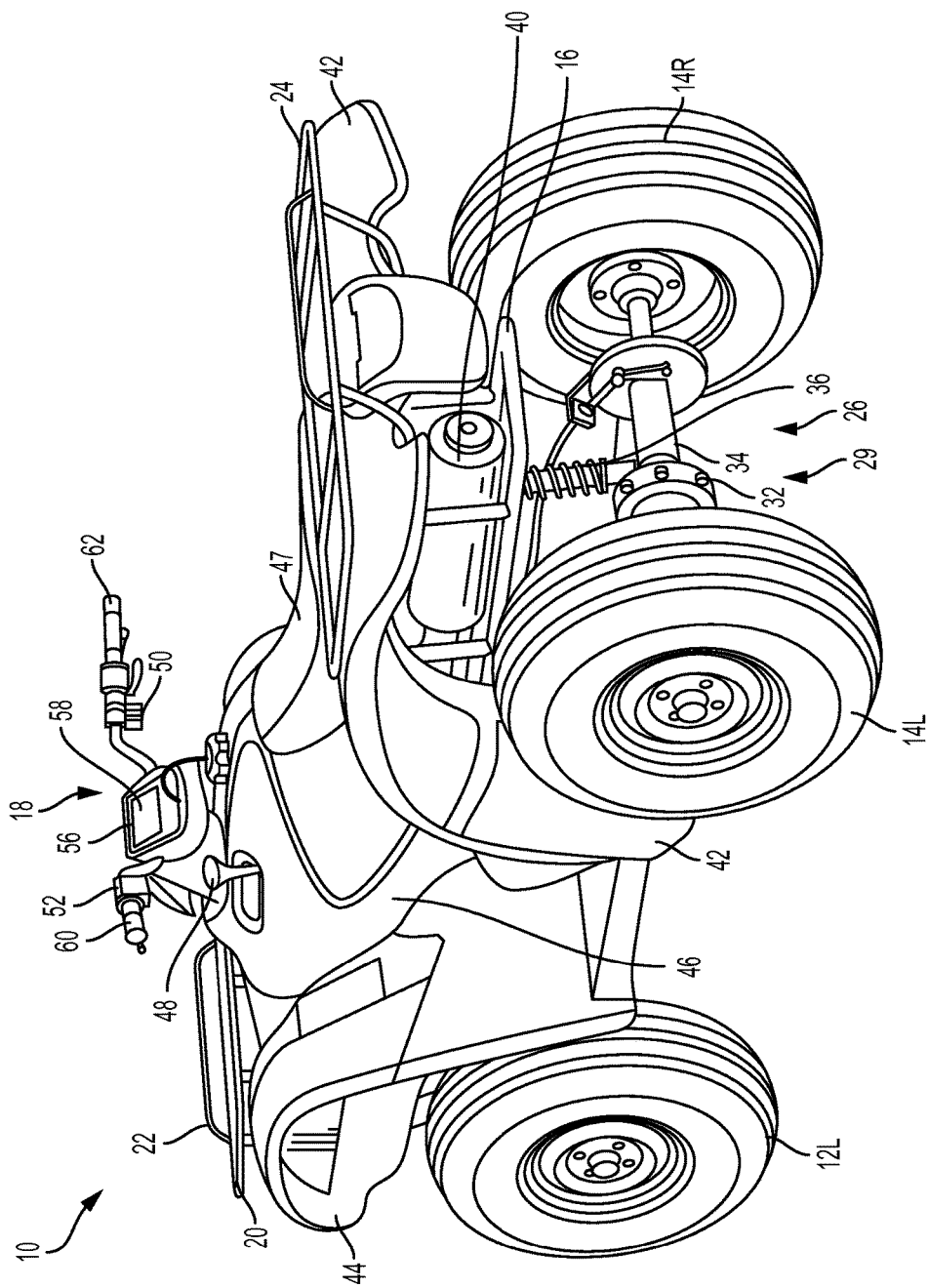
FIG. 3 is an elevated rear perspective view depicting a vehicle in accordance with the disclosed subject matter.

FIG. 1 is an elevated front perspective view depicting a vehicle with an attached vehicle accessory in accordance with the disclosed subject matter; and FIG. 3 is an elevated rear perspective view depicting a vehicle in accordance with the disclosed subject matter.

A vehicle 10 is disclosed herein as being an all-terrain vehicle ("ATV"). However, in alternative embodiments, the vehicle can be an automobile, a truck, a van, a recreational vehicle, a utility vehicle, a construction vehicle, agricultural equipment, or any other vehicle that could benefit from the installation, function, and/or use of the methods and apparatus disclosed herein.

The vehicle 10 can include a powertrain 26, a vehicle frame 16, and various body panels 46 covering the vehicle frame 16 and powertrain 26. The powertrain 26, can include a drivetrain 29 and a power source 38. The drivetrain 29 can include a front differential 28, a transmission 27, a rear differential 32, and two pairs of wheels, in particular a left front wheel 12L and right front wheel 12R, and a left rear wheel 14L and right rear wheel 14R. Each front wheel 12L, 12R and rear wheel 14L, 14R can be rotatably coupled with respect to the vehicle frame 16. The front wheels 12L, 12R can include steerable wheels. A pair of handlebars 18 can be operably coupled with the front wheels 12L, 12R to facilitate steering of the front wheels 12L, 12R. A headlight 54 can be attached to the handlebars 18, which can provide a forward light source for operating the vehicle 10 on a path in dimly lit or unlit environmental conditions.

The front differential 28 can be coupled to a pair of front axles 30 that can facilitate driving of the front wheels 12L, 12R. A pair of front dampers 31 can be attached between the respective pair of front axles 30 and the body panel 16. A pair of rear dampers 36 can be attached to a respective pair of rear axles 34 and the body frame 16. The rear final gear 32 can be coupled with the pair of rear axles 34 that can facilitate driving of the rear wheels 14L, 14R. The transmission 27 can be an automatic transmission, a manual transmission, or a semi-automatic transmission. The transmission 27 can be coupled to the front differential 28 and the rear differential 32. A coupling can connect an engine output shaft to an input shaft of the transmission 27 and permit selective engagement/disengagement of the transmission input shaft with the engine output shaft, or at least relative rotation of the engine output shaft with respect to the transmission input shaft, in any manner that is later developed or known in the art. Exemplary couplings can include, but are not limited to, a friction disc clutch and a torque convertor. The transmission 27 can include, but is not limited to, a multi-ratio gear transmission, a hydraulic-type transmission, a hydrostatic-type transmission, a belt-drive transmission (e.g., a continuously-variable transmission), or any of a variety or other suitable transmission arrangements.

The power source 38 can be an internal combustion engine, an electric motor, or a hybrid of an internal combustion engine and an electric motor that can provide a motive power to the drivetrain 29. The power source 38 (configured as an internal combustion engine or a hybrid power source) can have the engine output axis oriented in the longitudinal direction L or in the traverse direction T of the vehicle 10. The power source 38 can be mounted rearward of the front axles 30, forward of the rear axles 34, or an intermediate disposition the front and rear axles 30, 34. In the exemplary embodiment of FIG. 1, the power source 38 is configured as an intermediate-mounted internal combustion engine. Output exhaust gasses from an internal combustion engine can be channeled through an engine exhaust manifold and through an exhaust muffler 40. The exhaust muffler 40 can be disposed to direct exhaust gasses behind the vehicle 10 to enhance the safety of the operator.

In an embodiment, the transmission 27 can be configured to selectively or alternatively operate in a variety of different gears, such as reverse, first gear, second gear, third gear, fourth gear, fifth gear, and overdrive. When in neutral, power from the power source 38 is not transmitted to any of the wheels 12L, 12R and 14L, 14R. When the transmission 27 is in reverse, power from the power source 38 can be transmitted to at least one of the wheels 12L, 12R and 14L, 14R to facilitate movement of the vehicle 10 in a reverse direction. When in each of the first, second third, fourth, fifth and overdrive gears, power from the power source 38 can be transmitted to at least one of the wheels 12L, 12R and 14L, 14R at a variety of different forward speed ranges.

In an embodiment, the vehicle 10 can be configured to selectively and alternatively operate in a two-wheel drive (2WD) mode, a four-wheel drive (4WD) mode, or an all-wheel drive (AWD) mode. As illustrated in FIGS. 1 and 3, the vehicle 10 can include a 2WD/4WD shift lever 48 that can be connected to the transmission 27, electrically, mechanically, or elector-mechanically, such that actuation of the gear shift lever by the operator can effect a shift between 2WD mode and 4WD mode within the transmission 27. The 2WD/4WD shift lever 48 can be a mechanical lever or an electrical switch, as is known in the art. The 2WD/4WD shift lever 48 can be mounted in any one of a plurality of different locations within the vehicle 10 that is convenient to an operator.

The front differential 28 can facilitate operation of the vehicle 10, such that one of the front wheels 12L, 12R can rotate at a different speed relative to the other one of the wheels 12L, 112R as the vehicle travels a curved path, thereby affecting a desired operation of the vehicle 10 in certain driving conditions. The front differential 28 can, however, be selectively locked to ensure that both of the front wheels 12L, 12R rotate at the same wheel speed. To control a front differential lock, a differential lock switch 50 can be mounted on the handlebars 18. Upon actuation, the differential lock switch 50 can control any appropriate apparatus that can lock in the front differential 28 so that both front wheels 12L, 12R rotate at the same speed. In one embodiment, the differential lock switch 50 can include a three-position rocker switch or other suitable multi-position switch or multi-function button. To operate, an operator may actuate the differential lock switch 50 from either a lock-initiate or unlock-initiate position. Upon release, the differential lock switch 50 can automatically move into a home position. The differential lock switch 50 can be mounted on the pair of handlebars 18 adjacent a right hand grip 62, such that during operation of the vehicle 10, an operator can actuate the differential lock switch 50 (e.g., with a thumb) without releasing the right hand grip 62. In alternative embodiments, the differential lock switch 50 can be located adjacent a left hand grip 60 or at other various different suitable locations on the vehicle 10.

The body panels 46 can provide a protective and aesthetically pleasing cover for the powertrain 26 and the vehicle frame 16. The body panels 46 can include a pair of front wheel fenders 44 that can partially cover the front wheels 12L, 12R, and a pair of rear wheel fenders 42 that can partially cover the rear wheels 14L, 14R. The operator seat 47 can be disposed in a longitudinally centered position behind the handlebars 18.

The vehicle 10 can also include a front cargo rack 20 and a rear cargo rack 24 disposed above the vehicle body panels 46 that can facilitate support of cargo for transportation by the vehicle 10. The front cargo rack 20 can be connected to a front guard rail 22 that can protect a front of the vehicle 10 from damage caused by collision with an object in the path of the vehicle 10. The front and rear cargo racks 20, 24 and the front guard rail 22 can be provided as tubular metal frame assemblies.

2. Winch

Figure 2:
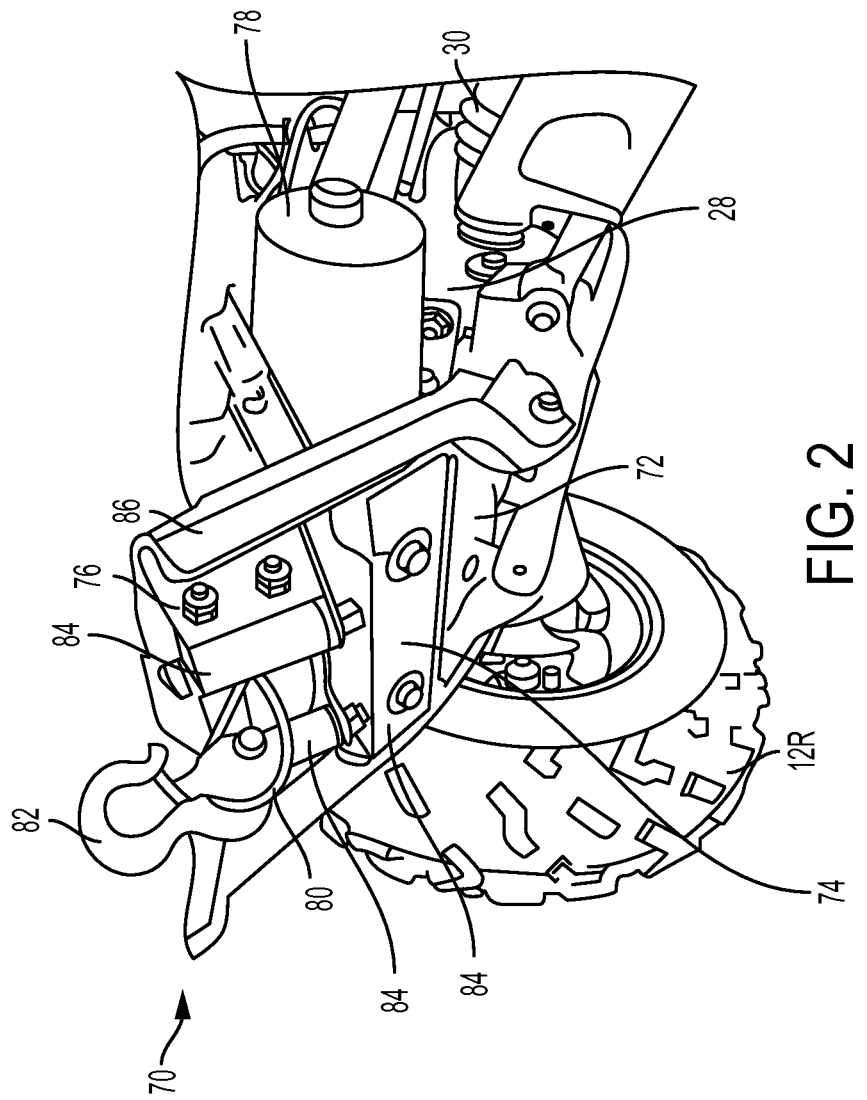
FIG. 2 is an enlarged front perspective view depicting a winch and front cover/fender assembly of a vehicle in accordance with the disclosed subject matter.

FIG. 2 is an enlarged front perspective view depicting a winch and front cover/fender assembly of a vehicle in accordance with the disclosed subject matter. In the embodiment, the winch assembly 70 can be disposed forward of the front axles 30 in an intermediate position between the front wheels 12L and 12R. Although the winch assembly 70 is illustrated in FIG. 2 at the front area of the vehicle 10, in alternative embodiments the winch assembly 70 may be disposed in other areas of the vehicle 10, such as a rear area intermediate position between left and right rear wheels 14L and 14R, a top area, or any other suitable area for attaching a winch assembly 70 to a vehicle.

The winch assembly 70 can include a winch motor 78, a winch cable 80 attached to a clevis hook assembly 82, and a front carrier/fender assembly 86. The front carrier/fender assembly 86 can include a winch mount plate 72, a plate clamp 74, and a fairlead 76. The winch mount plate 72 can be moveably attached to the vehicle frame 16, the front differential 28, or any suitable location at the front of the vehicle 10. The plate clamp 74 can be attached to an underside of the winch mount plate 72 (e.g., a side facing away from the vehicle 10) in any appropriate manner, such as but not limited to mechanical fasteners, glue, epoxy, welding, pressure fitting, etc. The fairlead 76 can be attached to an underside of the winch mount plate 72 (e.g., a side facing away from the vehicle 10) in any appropriate manner, such as but not limited to mechanical fasteners, glue, epoxy, welding, pressure fitting, etc. The fairlead 76 can include a pair of opposing rollers 84 that are aligned on opposing sides of an aperture in the winch mount plate 72.

The winch motor 78 can be attached, in a lateral disposition, to an opposing side of the winch mount plate 72 (e.g., a side facing the vehicle 10) using mounting holes that can align with the fasteners of the plate clamp 74, which can extend through the winch mount plate 72. In an alternative embodiment, the winch motor 78 can be attached to the winch mount plate 72 in any appropriate manner, such as but not limited to mechanical fasteners, glue, epoxy, welding, pressure fitting, etc. The winch motor 78 can include an appropriate AC or DC powered electric motor, and can be configured with various gears and control circuits to operate in a forward rotational direction or a reverse rotational direction.

A first end of the winch cable 80 can be attached to, and wind around, a rotating member connected to and driven by the winch motor 78. Once the fairlead 76 and winch motor 78 are attached to the winch mount plate 72, a second end of the winch cable 80, distal to the first end, can feed through the aperture in the winch mount plate 72 and between the fairlead rollers 84. Once the winch cable 80 is fed through the fairlead rollers 84, the clevis hook assembly 82 can rotatably attach to the second end of the winch cable 80. The clevis hook assembly 82 can removably couple to an aperture, hook, loop member, etc., on an external object, separate vehicle, or vehicle accessory to facilitate pulling or releasing the object, vehicle, or accessory during operation of the winch motor 78 in a forward rotational direction or a reverse rotational direction.

In one embodiment, the clevis hook assembly 82 can be removably coupled to a vehicle accessory that can be disposed at the front of the vehicle 10. In some embodiments, the winch assembly 70 can be configured to selectively or alternatively cause one or more actuations of a vehicle accessory. For example, the winch assembly 70 can be configured to selectively or alternatively raise or lower an accessory upon actuation of the winch motor 78 in a forward rotational direction or a reverse rotational direction.

In the embodiment illustrated in FIG. 1, a plow blade 64 accessory can be disposed at the front of the vehicle 10 and coupled to the winch assembly 70. The plow blade 64 can include a wear bar 66 that can be mounted and fastened to a bottom edge of the plow blade 64 in any appropriate manner, such as but not limited to mechanical fasteners, glue, epoxy, welding, pressure fitting, etc. In an embodiment, the wear bar 66 can be secured to a bottom edge of the plow blade 64 with carriage bolts 68. The plow blade 64 can be coupled to the winch assembly 70 by attaching the clevis hook assembly 82 and stringing the winch cable 80 through a mounting bracket on the plow blade 64, such as a spring bracket mounted to the convex side of the plow blade 64, or any suitable mounting bracket. Once the plow blade 64 has been mounted onto the winch assembly 70, actuation of the winch motor 78 in a forward direction can cause the winch cable 80 to unwind, thereby lowering the plow blade 64. Actuation of the winch motor 78 in a reverse direction can cause the winch cable to wind, thereby raising the plow blade 64.

3. Controls

Figure 4:
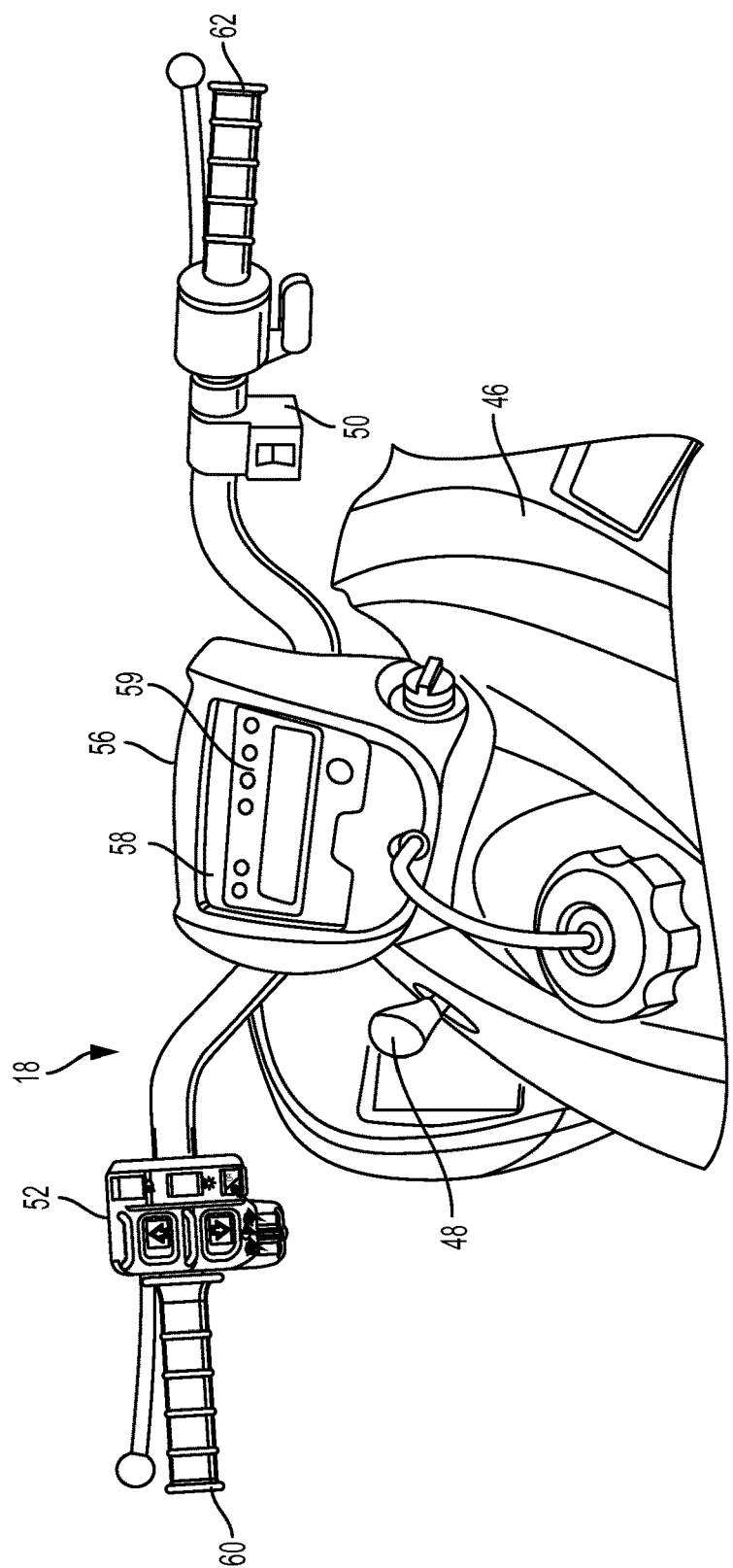
FIG. 4 is an enlarged elevated rear perspective view depicting handlebars and other components of the vehicle embodiments of FIGS. 1-3.

FIG. 4 is an enlarged elevated rear perspective view depicting handlebars and other components of the vehicle embodiments of FIGS. 1-3. The pair of handlebars 18 can be coupled to a center console 56 that can include a display screen 58 for displaying one or more indicators 59 related to operation or sensors of the vehicle 10. The indicators 59 can include, but are not limited to, speed, gear selection, fuel level, 2WD/4WD gear selection, battery status, etc. The indicators 59 can additionally include any one of an indicator light, a display icon, a heads-up display icon (such as in conjunction with a helmet, vehicle with a windshield, etc.), an audible indicator, or any other visual and/or audible indicator.

FIG. 4 also illustrates a switch assembly 52 disposed on the handlebars 18 and associated with the left hand grip 60 according to one embodiment. More specifically, switch assembly 52 can be disposed adjacent the left hand grip 60 between the left hand grip 60 and the center console 56. The switches and buttons disposed at the switch assembly 52 can be selectively depressed by a left hand of an operator without releasing the left hand grip 60. In alternative embodiments, the switch assembly 52 can be disposed in other suitable locations on the vehicle 10. For example, a switch assembly can alternatively be disposed on the handlebars 18 adjacent the right hand grip 62.

Figure 5:
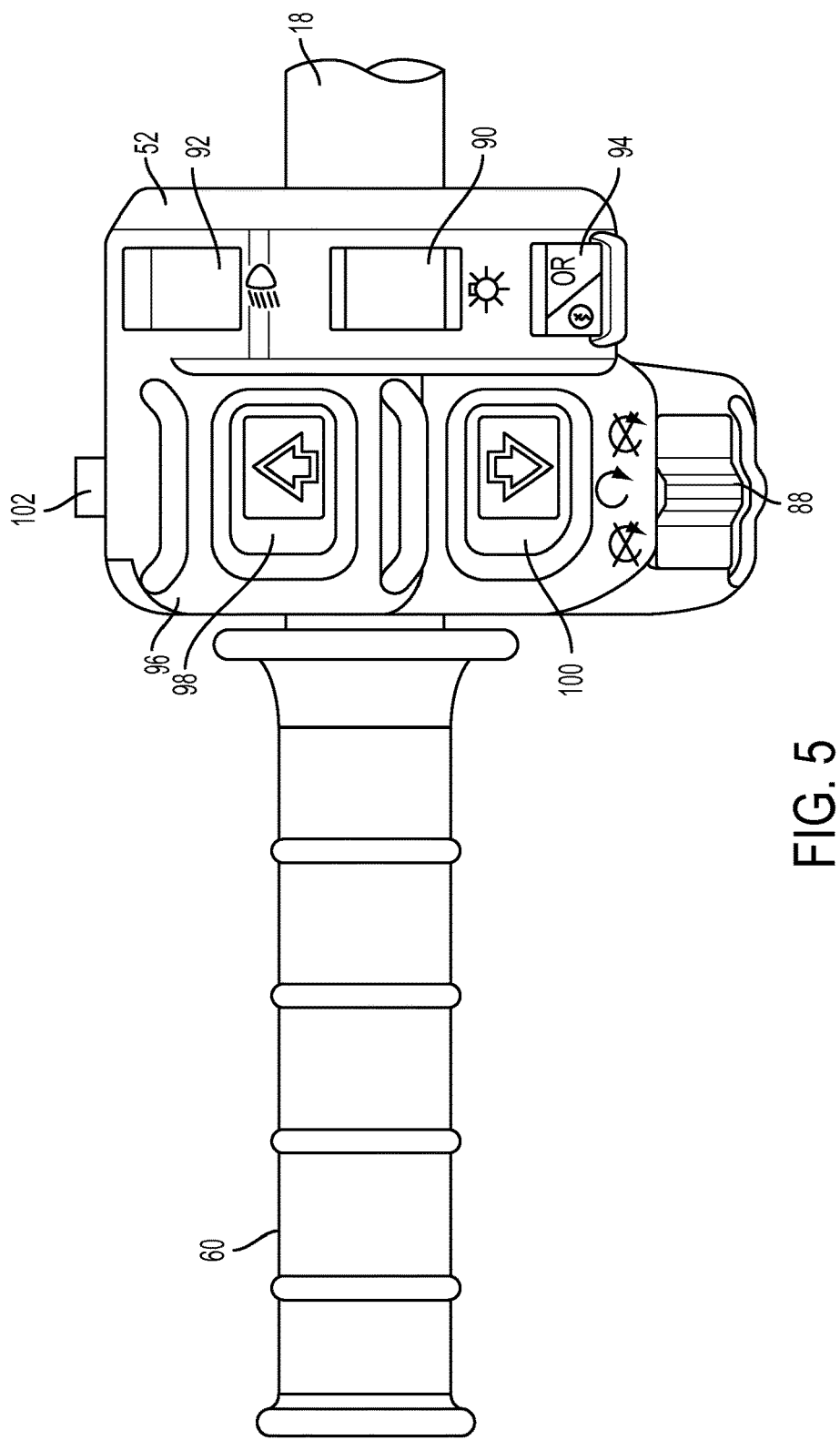
FIG. 5 is a rear view depicting a switch assembly associated with a portion of the handlebars of FIG. 4, according to one embodiment.

FIG. 5 is a rear view depicting a switch assembly associated with a portion of the handlebars of FIG. 4, according to one embodiment. FIG. 5 illustrates a more detailed view of the individual switches and buttons associated with the switch assembly 52 disposed at the handlebars 18 associated with the left hand grip 60. The switch assembly 52 can include, but is not limited to, an engine stop switch 88, a headlight switch 90, a hi/lo headlight switch 92 to adjust light intensity of the headlight 54, and an engine start switch 94.

The switch assembly 52 can further include an upshift button 98 (shown with an upward arrow in FIG. 5) and a downshift button 100 (shown with a downward arrow in FIG. 5) disposed within a shift buttons housing 96. The upshift button 98 and the downshift button 100 can facilitate electronic shifting of the transmission 27 between different driving gears. In particular, an operator can depress the upshift button 98 to shift the transmission 27 into a higher gear, and can depress the downshift button 100 to shift the transmission 27 into a lower gear. In such an embodiment, the transmission 27 can include an automated manual transmission (AMT) or any of a variety of other suitable electronic shift-type transmissions. In alternative embodiments, the electronic shifting of the transmission 27 can be achieved with any of a variety of suitable alternative shift actuators, such as a three-position rock switch similar to that described in relation to the differential lock switch 50.

In some embodiments, the switch assembly 52 can include a shift function override button 102 that can be selectively depressed by a left hand (e.g., a left thumb) of an operator without releasing the left hand grip 60. Actuation of the shift function override button 102 can initiate an override control causing the functions of the upshift button 98 and the downshift button 100 to cease actuating the transmission to shift into a higher or lower gear, respectively.

When the shift function override button 102 is depressed and held by an operator, the transmission shift function is placed into an override state. In the override state, the upshift button 98 and the downshift button 100 can be utilized to control one or more actions of a vehicle accessory, such as the winch motor 78. In turn, the winch motor can control the upward and downward movements of the plow blade 64. Thus, upon activating the shift function override button 102, the operator can cause the upshift button 98 to control the winch motor 78 to move in the first direction that can cause the winch assembly 70 to raise the plow blade 64, and can cause the downshift button 100 to control the winch motor 78 to move in the second direction that can cause the winch assembly 70 to lower the plow blade 64.

When the shift function override button 102 is no longer depressed by an operator, the toggling the functions of the upshift button 98 and the downshift button 100 are switched back to a normal state. In this state, the upshift button 98 and the downshift button 100 cease controlling the vehicle accessory (e.g., the winch motor 78), and resume the function of actuating the transmission to shift into a higher or lower gear, respectively.

The disposition of the shift function override button 102 at the switch assembly 52 can be beneficial because it enables the accessory to be controlled without releasing the left or right hand grips 60, 62. This feature is especially beneficial in situations requiring repetitive actuations of the winch assembly 70, and where the operator of the vehicle 10 does not need to shift the transmission 27 to a higher or lower gear. In contrast, related art winch control switches are physically separated from the switch assembly 52, and thus require the operator to release the left hand grip 60 (e.g., the throttle) to access a remotely positioned winch control switch.

In a situation requiring frequent raising and lowering of the plow blade 64 (such as plowing snow, dirt, gravel, etc.), the winch assembly 70 is utilized to frequently raise and lower the plow blade 64. The need to repeatedly move the hand position from the left hand grip 60 to access a winch control switch to raise and lower the plow blade 64 can become troublesome and possibly dangerous to an operator. It can be beneficial to provide the shift function override button 102 on the switch assembly 52 so that an operator can control the operation of the winch motor 78 without the need to remove the vehicle operator's hand from the left hand grip 60. Thus, the disclosed embodiments advantageously allow an operator to disable the function of the upshift and downshift buttons 98, 100 for the transmission 27, and repurpose the upshift and downshift buttons 98, 100 to operate a vehicle accessory.

4. Multi-Use Switches

Figure 6:
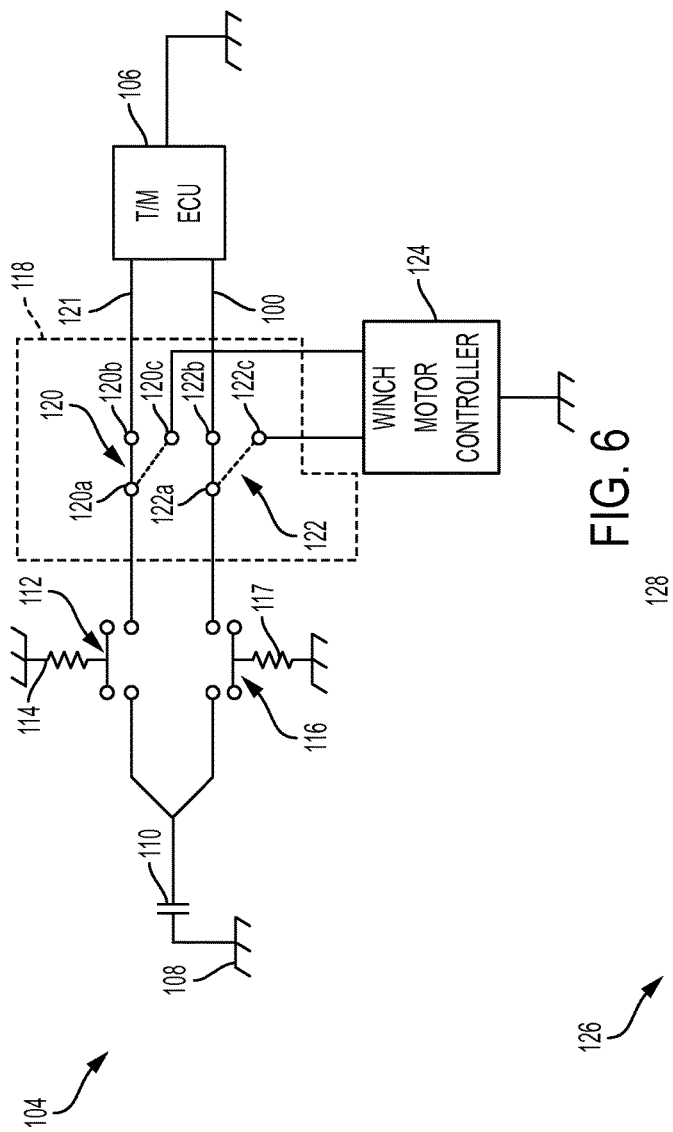
FIG. 6 is a schematic depicting an electromechanical shift override controller and certain associated vehicle components of FIGS. 1-6.

FIG. 6 is a schematic depicting an electromechanical shift override controller and certain associated vehicle components of FIGS. 1-6. In one embodiment, the upshift button 98 and downshift button 100 for the transmission 27 can be configured to control the operation of a winch motor controller 124. The winch motor controller 124 can include any suitable electromechanical controller for controlling the operations of the winch motor 78. The upshift and downshift buttons 98, 100 can thus be configured as multi-use or dual-purpose switches. For example, when a change to a higher or lower transmission gear is not needed, and the operator desires to raise and lower the plow blade 64 using the winch assembly 70, the shift function override button 102 can be actuated to override the gear changing function of the upshift and downshift buttons 98, 100 to function as controls to raise and lower the plow blade 64.

In FIG. 6, an electromechanical circuit 104 can be used to facilitate the use of the upshift button 98 and downshift button 100 as dual-use switches that control a vehicle accessory. The vehicle 10 can include an override relay 118 that can be configured to facilitate selective electrical communication between the upshift and downshift buttons 98, 100 and one of the winch motor and transmission 27, in response to actuation of the shift function override button 102. In FIG. 6, the circuit can be powered by a vehicle battery 110, for example any AC or DC battery suitable to provide power to a vehicle. All components in the electromechanical circuit 104 can be grounded to a common ground 108.

An electronic control unit (ECU) 106 can be a processor that is operationally connected to each component in the electromechanical circuit 104, and can provide communications, process algorithms, provide a memory to store instructions, and execute instructions for the electromechanical circuit 104. The override relay 118 can include a pair of two-position switches (e.g., toggle switches) that can be actuated by depression of the shift function override button 102. An input 120*a* of the override relay 118 can be electrically coupled with the upshift contact 112, which is the contact for the upshift button 98, the winch motor controller 124, and the ECU 106.

In some embodiments, the ECU 106 can control the upshifting or downshifting functions of the transmission 27. The winch motor controller 124 can be electrically coupled to the winch motor 78, and can control a mechanical function of the winch motor 78, such as to actuate the winch motor 78 in a forward rotational direction, to actuate the winch motor 78 in a reverse rotational direction, or to stop the movement of the winch motor 78. First and second outputs 120*b* and 120*c* of the two-position switch 120 can be electrically coupled with the winch motor controller 124 and the ECU 106. An input 122*a* of the override relay 118 can be electrically coupled with the downshift contact 116, which is the contact for the downshift button 100, the winch motor controller 124, and the ECU 106. First and second outputs 122*b* and 122*c* of the two-position switch 120 can be electrically coupled with the ECU 106 and the winch motor controller 124, respectively. The upshift contact 112 and the downshift contact 116 can be electrically coupled to the transmission through resistors 114 and 117, respectively, and electrically coupled with the battery 110.

The override relay 118 can be operable in one of an energized mode and a de-energized mode depending upon actuation of the shift function override button 102. In one embodiment, the ECU 106 can function as a general purpose transmission (T/M) control unit (TCU) that is configured to control at least one function of the transmission 27, such as shifting to a higher or lower gear. The ECU can also impede or prevent energization of the override relay 118, such that the override relay 118 is in the de-energized mode. When the override relay 118 is in the de-energized mode, the pair of two-position switches 120, 122 can be in a first position (shown as solid lines in FIG. 6), such that actuation of the upshift or downshift buttons 98, 100 provides power from the battery 110, which in turn closes the upshift contact 112 or the downshift contact 116, respectively, which provides electrical power to the transmission 27 and/or an electrical charge to the ECU indicating to shift a gear.

Once an operator depresses and holds the shift function override button 102 for a predetermined period, the operator can release the shift function override button 102, which places the override relay in the energized mode. When the override relay 118 is in the energized mode, the pair of two-position switches 120, 122 can switch to the second position (shown as dotted lines in FIG. 6), such that the actuation of the upshift contact 112 (by the upshift button 98), or actuation of the downshift contact 116 (by the downshift button 100), provide circuits that are in electrical communication with the winch motor controller 124, and can provide power from the battery 110 to a controller for the winch motor controller 124. In the energized mode, the override relay 118 can enable the upshift button 98 to control at least one operation of the winch motor controller 124, such as to cause the winch motor to operate in a reverse rotational direction.

As described above, when the winch motor controller 124 operates in a reverse rotational direction, the winch motor controller 124 winds the winch cable 80, thereby moving the plow blade 64 in an upward direction. Likewise, in the energized mode, the override relay 118 can enable the downshift button 100 to control at least one operation of the winch motor controller 124, such as to cause the winch motor to operate in a forward rotational direction. As described above, when the winch motor controller 124 operates in a forward rotational direction, the winch motor controller 124 unwinds the winch cable 80, thereby allowing the plow blade 64 to move in a downward direction.

Figure 7:
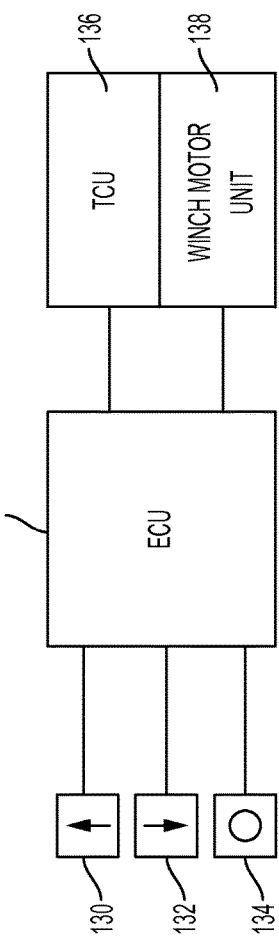
FIG. 7 is a schematic depicting an electronic shift override circuit and certain associated vehicle components of FIGS. 1-6.

FIG. 7 is a schematic depicting an electronic shift override circuit and certain associated vehicle components of FIGS. 1-6. The electronic shift override circuit 126 may be implemented in any suitable hardware, software, firmware, or combination thereof, that exists in the related art or that is later developed. The electronic shift override circuit 126 can include an upshift function unit 130, a downshift function unit 132, an ECU 128, a transmission control unit (TCU) 136, a winch motor control function unit 138, and a shift function override unit 134. The ECU 128 can be a processor that is operationally connected to each unit in the electronic circuit 126, and can provide communications, process algorithms, provide a memory to store instructions, and execute instructions for the electronic circuit 126. In an alternative embodiment, the ECU may be in communication with each unit in the electronic circuit 126 over a network, such as a controller area network (CAN) bus for the vehicle 10. In an additional alternative embodiment, one or more of the individual units of the electronic circuit 126 can include an ECU or processor that can provide communications, process algorithms, and execute instructions for the respective unit.

The upshift function unit 130 can be actuated by a signal from the upshift button 98. The downshift function unit 132 can be actuated by a signal from the downshift button 100. The winch motor control function unit 138 can control a mechanical function of the winch motor 78, such as to actuate the winch motor 78 in a forward rotational direction, a reverse rotational direction, or to stop the winch motor 78. The shift function override unit 134 can receive an execution signal from the shift function override button 102. The TCU 136 can control the upshifting or downshifting functions of the transmission 27 via signals from the upshift function unit 130 and the downshift function unit 132, respectively. The ECU 128 can control the functions of the winch motor control function unit 138 that is electrically coupled to the winch motor 78.

In one embodiment, to facilitate the use of the upshift button 98 and downshift button 100 as dual-use switches to control a vehicle accessory, the vehicle 10 can include an override function that can be configured to facilitate selective electrical communication between the upshift and downshift buttons 98, 100 and one of the winch motor 78 and transmission 27, in response to actuation of the shift function override button 102.

The electronic shift override circuit 126 can be operable in one of an activated mode and a deactivated mode depending upon status of the shift function override unit 134. The ECU 128 can be coupled with various sensors of the transmission 27 that can determine the current gear engagement. In one embodiment, the ECU 128 can function as a general purpose TCU that is configured to control at least one function of the transmission 27, such as shifting to a higher or lower gear and thereby negate the need for a separate TCU 136. The ECU 128 can also impede or prevent activation of the shift override function unit 134 such that the shift override function unit 134 is in the deactivated mode. When the shift override function unit 134 is in the deactivated mode, TCU 136 can control shifting of the transmission 27 between gears in response to signals from the upshift or downshift buttons 98, 100.

Once an operator depresses and holds the shift function override button 102 for a predetermined time period, the operator can release the shift function override button 102, which places the shift function override unit 138 into the activated mode. When the shift function override unit 134 is in the activated mode, activation of the upshift function unit 130 (by the upshift button 98) or actuation of the downshift function unit 132 (by the downshift button 100) can result in the ECU 128 switching functional use of the upshift button 98, and downshift button 100 into controlling at least one function of a vehicle accessory.

In one embodiment, the ECU 128 can switch functional use of the upshift button 98 and downshift button 100 into controlling the winch motor control function unit 138, such as to instruct the winch motor 78 to operate in a forward or reverse rotational direction. In the activated mode, when the winch motor control function unit 138 receives a signal from the upshift function unit 130, the winch motor control function unit 138 can signal the winch motor 78 to operate in a forward rotational direction. Likewise, in the activated mode, when the winch motor control function unit 138 receives a signal from the downshift function unit 132, the winch motor control function unit 138 can signal the winch motor 78 to operate in a reverse rotational direction. As described above, when the winch motor 78 operates in a reverse rotational direction, the winch cable 80 pulls against a spring bracket of the plow blade 64, causing the plow blade to move in an upward direction, and when the winch motor 78 operates in a forward rotational direction, the winch motor controller 124 unwinds the winch cable 80, thereby allowing the plow blade 64 to move in a downward direction.

5. Alternative Embodiments

While certain embodiments of the invention are described above, and FIGS. 1-7 disclose the best mode for practicing the various inventive aspects, it should be understood that the invention can be embodied and configured in many different ways without departing from the spirit and scope of the invention.

While the embodiment for the vehicle 10 is described with two pairs of wheels, alternative embodiments for the vehicle 10 can include more than two pairs of wheels, such as a six-wheeled vehicle.

Embodiments are disclosed above in the context of a plow blade 64 shown in FIG. 1. However, embodiments are intended to include or otherwise cover any type of different suitable vehicle accessories that can be mounted to the vehicle 10, including but not limited to, a bucket, forklift forks, a platform, a bale spear or spike, etc.

Exemplary embodiments are also intended to cover any manner or structure of winch or winch assembly, including but not limited to known or later developed winches. Exemplary embodiments are further intended to cover apparatus unrelated to winch assemblies.

Exemplary embodiments are intended to cover execution of instructions of the ECU 106 and/or ECU 128 in any order relative to one another. In addition, instructions can be omitted, added, and/or modified.

The embodiments re disclosed above in the context of two buttons, i.e., upshift and downshift buttons 98, 100, that are switchable between controlling the gears and the winch. However, embodiments are intended to cover or otherwise include any number of buttons that can be switched between different modes, including a single button, three or more buttons, etc.

The embodiments are also disclosed above in the context of switching between two different modes of operation, i.e., where the upshift and downshift buttons 98, 100 are switchable between controlling the gears and the winch. However, embodiments are intended to include or otherwise cover switching between any number of different modes, i.e., three or more different modes.

The embodiments are also disclosed above in the context of the selectors, i.e., upshift and downshift buttons 98, 100, and shift function override button 102, being in the form of buttons. However, embodiments are intended to include or otherwise cover any form of known, related art or later developed selector, such as a switch, touch screen, etc.

Embodiments are also intended to include or otherwise cover methods of using and methods of manufacturing the override circuits disclosed above. The methods of manufacturing include or otherwise cover processors and computer programs implemented by processors used to design various elements of the override circuits disclosed above. For example, embodiments are intended to cover processors and computer programs used to design or create functions that can cause actions to control a vehicle accessory as described above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a controller area network, a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A control system for use with a vehicle having handlebars that are configured to enable vehicle steering, the handlebars defining a pair of grasping portions that are disposed to facilitate grasping by a vehicle operator's hands, the vehicle including a powertrain and an accessory, the control system comprising:

a manually actuable primary selector disposed adjacent one of the grasping portions to enable manual actuation while one of the vehicle operator's hands grasps the one grasping portion, the primary selector being configured to be in selective electrical communication with the powertrain to operate in a powertrain mode to control a function of the powertrain; and a manually actuable override selector disposed adjacent the one grasping portion, the override selector being configured to activate an override mode in which the primary selector is in selective electrical communication with the accessory to control a function of the accessory, and in which electrical communication with the powertrain is terminated.

2. The control system according to claim 1, wherein the powertrain of the vehicle includes a transmission, and the primary selector is configured to control the transmission, such that actuating the primary selector into the powertrain mode enables the primary selector to be used to change gears of the transmission.

3. The control system according to claim 2, wherein the primary selector includes a pair of buttons, one of the buttons being configured to enable a manual upshifting of the gears of the transmission, and the other of the pair of buttons being configured to enable a manual downshifting of the gears of the transmission.

4. The control system according to claim 3, wherein the override selector includes a bias and a single button, the bias being communicating with the single button to bias the single button in an upper position, and to enable manual depression of the button to a lower position, such that cessation of the manual depression enables the bias to automatically return the single button to the upper position.

5. The control system according to claim 4, wherein the accessory of the vehicle is a winch that controls a plow blade.

6. The control system according to claim 5, wherein the one of the pair of buttons of the primary selector is configured to enable a raising in height of the plow blade, and the other of the pair of buttons is configured to enable a lowering in height of the plow blade.

7. The control system according to claim 1, further including a housing that is supported by the handlebars and disposed adjacent the one grasping portion, the housing being configured to support the primary selector and override selector.

8. The control system according to claim 7, wherein the housing defines an upper surface that is disposed to face an upward direction that is perpendicular to a path of travel of the vehicle, and a front surface that faces the path of travel of the vehicle, the primary selector being disposed at the upper surface of the housing, and the override selector being disposed at the front surface of the housing.

9. The control system according to claim 1, where the override selector includes an override relay and an override electric circuit that are configured to facilitate selective electrical communication between the primary selector and one of the powertrain and the accessory in response to actuation of the override selector.

10. The control system according to claim 9, wherein the vehicle includes a battery that is configured to provide power to various features of the vehicle, including the override electric circuit.

11. A vehicle for transporting an operator, comprising:
handlebars that are configured to enable vehicle steering, the handlebars defining a pair of grasping portions that are disposed to facilitate grasping by hands of the operator;
a powertrain and an accessory that is at least in part separate from the powertrain; and
a control system that includes:
a manually actuable primary selector disposed adjacent one of the grasping portions to enable manual actuation while one of the vehicle operator's hands grasps the one grasping portion, the primary selector being configured to be in selective electrical communication with the powertrain to operate in a powertrain mode to control a function of the powertrain; and
a manually actuable override selector disposed adjacent the one grasping portion, the override selector being configured to activate an override mode in which the primary selector is in selective electrical communication with the accessory to control a function of the accessory, and in which electrical communication with the powertrain is terminated.

12. The vehicle according to claim 11, wherein the powertrain includes a transmission, and the primary selector is configured to control the transmission, such that actuating the primary selector into the powertrain mode enables the primary selector to be used to change gears of the transmission.

13. The vehicle according to claim 12, wherein the primary selector includes a pair of buttons, one of the buttons being configured to enable a manual upshifting of the gears of the transmission, and the other of the pair of buttons being configured to enable a manual downshifting of the gears of the transmission.

14. The vehicle according to claim 13, wherein the override selector includes a bias and a single button, the bias being communicating with the single button to bias the single button in an upper position, and to enable manual depression of the button to a lower position, such that cessation of the manual depression enables the bias to automatically return the single button to the upper position.

15. The vehicle according to claim 14, wherein the accessory of the vehicle is a winch that controls a plow blade.

16. The vehicle according to claim 15, wherein the one of the pair of buttons of the primary selector is configured to enable a raising in height of the plow blade, and the other of the pair of buttons is configured to enable a lowering in height of the plow blade.

17. The vehicle according to claim 11, further including a housing that is supported by the handlebars and disposed adjacent the one grasping portion, the housing being configured to support the primary selector and override selector.

18. The vehicle according to claim 17, wherein the housing defines an upper surface that is disposed to face an upward direction that is perpendicular to a path of travel of the vehicle, and a front surface that faces the path of travel of the vehicle, the primary selector being disposed at the upper surface of the housing, and the override selector being disposed at the front surface of the housing.

19. The vehicle according to claim 11, where the override selector includes an override relay and an override electric circuit that are configured to facilitate selective electrical communication between the primary selector and one of the powertrain and the accessory in response to actuation of the override selector; and wherein the vehicle includes a battery that is configured to provide power to various features of the vehicle, including the override electric circuit.

20. A method of manufacturing a control system for use with a vehicle having handlebars that are configured to enable vehicle steering, the handlebars defining a pair of grasping portions that are disposed to facilitate grasping by a vehicle operator's hands, the vehicle including a powertrain and an accessory, the method comprising:
disposing a manually actuable primary selector adjacent one of the grasping portions to enable manual actuation while one of the vehicle operator's hands grasps the one grasping portion;
configuring the primary selector to be in selective electrical communication with the powertrain to operate in a powertrain mode to control a function of the powertrain;
disposing a manually actuable override selector adjacent the one grasping portion; and
configuring the override selector to activate an override mode in which the primary selector is in selective electrical communication with the accessory to control a function of the accessory, and in which electrical communication with the powertrain is terminated.

\* \* \* \* \*